US006976532B2

(12) United States Patent
Zhan et al.

(10) Patent No.: US 6,976,532 B2
(45) Date of Patent: Dec. 20, 2005

(54) ANISOTROPIC THERMAL APPLICATIONS OF COMPOSITES OF CERAMICS AND CARBON NANOTUBES

(75) Inventors: Guodong Zhan, Davis, CA (US); Joshua D. Kuntz, Lafayette, CA (US); Amiya K. Mukherjee, Davis, CA (US)

(73) Assignee: The Regents of the University of California, Oakland, CA (US)

( * ) Notice: Subject to any disclaimer, the term of this patent is extended or adjusted under 35 U.S.C. 154(b) by 33 days.

(21) Appl. No.: 10/606,941

(22) Filed: Jun. 26, 2003

(65) Prior Publication Data

US 2004/0261978 A1     Dec. 30, 2004

(51) Int. Cl.$^7$ ................................................ F28F 7/00
(52) U.S. Cl. ...................... 165/185; 165/905; 165/80.3
(58) Field of Search ................................ 165/185, 80.3, 165/104.33, 906, 905; 423/447.1; 501/95.2, 501/95.1; 361/704, 708, 712, 713; 257/703

(56) References Cited

U.S. PATENT DOCUMENTS

| | | | |
|---|---|---|---|
| 4,565,747 A | 1/1986 | Nakae et al. | |
| 4,756,976 A | 7/1988 | Komeya et al. | |
| 4,889,548 A | 12/1989 | Kriegesmann et al. | |
| 5,637,406 A | 6/1997 | Asai et al. | |
| 5,955,148 A | 9/1999 | Shimoda et al. | |
| 5,991,155 A | 11/1999 | Kobayashi et al. | |
| 6,231,998 B1 | 5/2001 | Bowker et al. | |
| 6,355,332 B1 | 3/2002 | Kobayashi | |
| 6,407,922 B1 * | 6/2002 | Eckblad et al. | ............. 361/704 |
| 6,420,293 B1 * | 7/2002 | Chang et al. | ............... 501/95.2 |
| 6,465,561 B1 | 10/2002 | Yarbrough et al. | |
| 6,498,726 B2 | 12/2002 | Fuller et al. | |
| 6,794,035 B2 * | 9/2004 | Tobita et al. | ............... 428/402 |
| 2002/0038704 A1 * | 4/2002 | Houle et al. | ................ 165/185 |
| 2002/0061396 A1 | 5/2002 | White | |
| 2002/0124932 A1 | 9/2002 | Blain et al. | |
| 2002/0130407 A1 * | 9/2002 | Dahl et al. | .................. 257/712 |
| 2003/0077478 A1 * | 4/2003 | Dani et al. | .................. 428/673 |
| 2003/0096104 A1 * | 5/2003 | Tobita et al. | ............... 428/332 |
| 2003/0117770 A1 * | 6/2003 | Montgomery et al. | ...... 361/687 |
| 2003/0151030 A1 * | 8/2003 | Gurin | ......................... 252/502 |
| 2004/0009353 A1 * | 1/2004 | Knowles et al. | ......... 428/411.1 |
| 2004/0104014 A1 * | 6/2004 | O'Connor et al. | ..... 165/104.33 |

OTHER PUBLICATIONS

Karlsson et al., "The effect of the thermal barrier coating on the displacement instability in thermal barrier systems", *Acta Materialia* 50: 1211-1218 (2002).

Sharafat et al., "Development of composite thermal barrier coatings with anisotropic microstructure", *Vacuum* 59: 185-193 (2000).

"Research Programs in Materials Reliability Division: Physical Properties of Thin Films and Nanostructures" http://www.boulder.nist.gov/div853/Program5_physprop.htm.

* cited by examiner

Primary Examiner—Tho Duong
(74) Attorney, Agent, or Firm—M. Henry Heines; Townsend and Townsend and Crew, LLP

(57) ABSTRACT

Ceramic materials are converted to materials with anisotropic thermal properties by forming the ceramics into composites with carbon nanotubes dispersed therein and uniaxially compressing the composites in a direction in which a lower thermal conductivity is desired.

16 Claims, 3 Drawing Sheets

ANISOTROPIC THERMAL APPLICATIONS OF COMPOSITES OF CERAMICS AND CARBON NANOTUBES

STATEMENT AS TO RIGHTS TO INVENTIONS MADE UNDER FEDERALLY SPONSORED RESEARCH OR DEVELOPMENT

This invention was made with Government support by Grant (or Contract) No. G-DAAD 19-00-1-0185, awarded by the U.S. Army Research Office. The Government has certain rights in this invention.

BACKGROUND OF THE INVENTION

1. Field of the Invention

This invention resides in the field of anisotropic thermal barriers and heat-spreading materials, and further relates to ceramics, particularly of nanocrystalline structure, and carbon nanotubes.

2. Description of the Prior Art

Anisotropic thermal diffusivity is a quality that is sought in materials that are used in a wide range of applications, extending from a miniature scale such as components in the microelectronics industry to those of a relatively large scale such as structural components in aircraft engines. Coatings, layers, or components that conduct heat at a lower rate in one direction than in another direction that is orthogonal to the first are useful in dissipating heat to avoid localized hot spots or to insulate the surfaces of components from high-temperature environments. Heat dissipation, or heat-spreading, layers or coatings are used in microprocessors and integrated circuit packages to overcome the increased risk of damage due to the high power of the circuitry elements. The heat sinks in these devices must be lightweight and compact and yet able to absorb the heat from exothermic (heat-generating) electronic components in a highly efficient manner. The interposition of a heat-spreading layer between the exothermic element and the heat sink will cause the heat to travel laterally to extend over a broad heat sink area, adding significantly to the effectiveness of the heat sink. On a larger scale, the ability to spread heat laterally is useful in thermal barrier coatings such as those commonly used on high-temperature components in turbine engines as well as high-temperature reactors and spacecraft.

Thermal barrier coatings of anisotropic thermal conductivity have been formed by various methods, examples of which are thermal spraying, electron beam-physical vapor deposition, plasma spraying, and the use of materials such as graphites that possess a natural anisotropic crystal orientation that can be enhanced by roll pressing. Other anisotropic thermal materials include sintered aluminum nitride, carbon/carbon fiber composites, aerogels impregnated with ceramic fibers such as zirconium dioxide, silicon nitride, silicon carbide, alumina, and zirconium aluminate, and multilayered materials of various kinds.

SUMMARY OF THE INVENTION

It has now been discovered that a ceramic can be transformed into an anisotropic material by combining the ceramic with single-wall carbon nanotubes to form a composite, consolidating the composite into a continuous mass, and uniaxially compressing the composite during consolidation. The resulting product has a thermal conductivity along the direction of compression that is significantly lower than the thermal conductivity in directions transverse to the direction of compression. The composite can thus be formed as a film or sheet with a low thermal conductivity in the direction extending from one face of the film or sheet to the other and a high thermal conductivity in the direction within the plane of the film or sheet. The composite can also be formed in other shapes such as bars, disks or blocks with a similar difference in thermal conductivity between two orthogonal directions. The inclusion of the carbon nanotubes in the composites enhances the response of the material to the uniaxial compression by increasing the resulting difference in thermal conductivity between the direction of compression and directions transverse to the direction of compression. Thus, in ceramics in which uniaxial compression effects no change in the thermal conductivity, the carbon nanotubes cause a change to occur either primarily or entirely in one direction and to a lesser extent or not at all in other directions. Preferred methods of compression are hot-pressing or other sintering methods, and the most preferred is electric field-assisted sintering, also known as spark plasma sintering.

This invention thus resides in microelectronics devices, semiconductor packages, printed circuit boards, and other devices that contain small electronic components that cause highly localized heat generation during use, and in blades and other components of gas turbine engines, high-temperature reactors, and any vessel walls or structural components that are exposed to high-temperature environments, such devices or components having a coating, layer, or section that is formed of a uniaxially compressed composite of carbon nanotubes in a ceramic matrix. The composite can thus be a layer interposed between an exothermic device and a heat sink, or it may serve as a heat sink itself, or it may be a layer protecting a structure component from an environment, or it may constitute the entire structural material itself. Use of the anisotropic composite offers the advantages of a longer useful life of components and equipment, greater reliability in performance, and greater ability to withstand extreme temperature conditions. Examples of applications in which the composite will be useful are microelectronics devices, microwave devices, consumer products, medical devices, batteries, solid oxide fuel cells, chemical sensors, and equipment used in the aerospace and defense industries.

DETAILED DESCRIPTION OF THE INVENTION AND PREFERRED EMBODIMENTS

Figure 1:
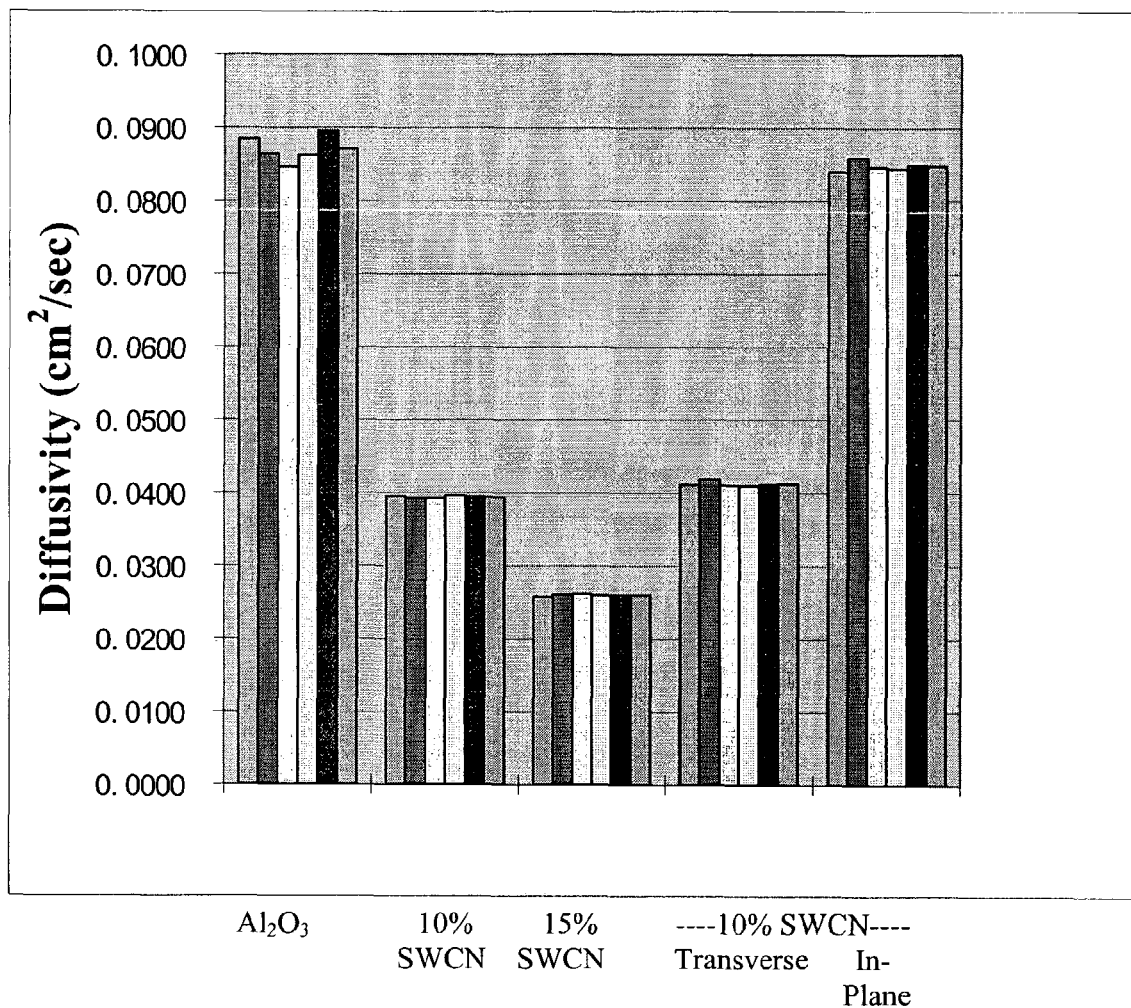
FIG. 1 is a bar graph comparing thermal diffusivities of various materials both within and outside of the present invention and in different orientations.

Ceramic materials that can be used as the major component of the composites of this invention include ceramics in general, although preferred ceramics for use in this invention are metal oxides. Examples of metal oxide ceramics are alumina, magnesium oxide, zirconia, magnesia spinel, titania, calcium aluminate, cerium oxide, chromium oxide, and hafnium oxide. Further examples are combinations that include non-metal oxides such as silica. Still further examples are metallic oxides that also contain elements in addition to metals and oxygen, such as SiAION and AION. A metal oxide that is currently of particular interest is alumina, either α-alumina, γ-alumina, or a mixture of both. When γ-alumina is used as part or all of the starting material, the γ-alumina will often convert to α-alumina during the consolidation.

Carbon nanotubes are polymers of pure carbon. Both single-wall and multi-wall carbon nanotubes can be used in the practice of this invention, although single-wall carbon nanotubes are preferred. Single-wall and multi-wall carbon nanotubes are known in the art and the subject of a considerable body of published literature. Examples of literature describing carbon nanotubes are Dresselhaus, M. S., et al., *Science of Fullerenes and Carbon Nanotubes,* Academic Press, San Diego (1996), and Ajayan, P. M., et al., "Nanometre-Size Tubes of Carbon," *Rep. Prog. Phys.* 60 (1997): 1025–1062. The structure of a single-wall carbon nanotube can be described as a single graphene sheet rolled into a seamless cylinder whose ends are either open or closed. When closed, the ends are capped either by half fullerenes or by more complex structures such as pentagonal lattices. The average diameter of a single-wall carbon nanotube is within the range of 0.5 to 100 nm, and more typically, 0.5 to 10 nm, 0.5 to 5 nm, or 0.7 to 2 nm. The aspect ratio, i.e., length to diameter, can range from about 25 to about 1,000,000, and commonly from about 100 to about 1,000. Thus, a nanotube of 1 nm diameter may have a length of from about 100 to about 1,000 nm. (All ranges stated herein are approximate.) Nanotubes frequently exist as "ropes," which are bundles of 10 to 500 single-wall nanotubes held together along their lengths by van der Waals forces. Individual nanotubes often branch off from a rope to join nanotubes of other ropes. Multi-walled carbon nanotubes are two or more concentric cylinders of graphene sheets. The cylinders are of successively larger diameter to fit one inside another, forming a layered composite tube bonded together by van der Waals forces, the distance between layers typically being approximately 0.34 nm as reported by Peigney, A., et al., "Carbon nanotubes in novel ceramic matrix nanocomposites," *Ceram. Inter.* 26 (2000) 677–683.

Carbon nanotubes are commonly prepared by arc discharge between carbon electrodes in an inert gas atmosphere. The product is generally a mixture of single-wall and multi-wall nanotubes, although the formation of single-wall nanotubes can be favored by the use of transition metal catalysts such as iron or cobalt. Single-wall nanotubes can also be prepared by laser ablation, as disclosed by Thess, A., et al., "Crystalline Ropes of Metallic Carbon Nanotubes," *Science* 273 (1996): 483–487, and by Witanachi, S., et al., "Role of Temporal Delay in Dual-Laser Ablated Plumes," *J. Vac. Sci. Technol. A* 3 (1995): 1171–1174. A further method of producing single-wall nanotubes is the HiPco process disclosed by Nikolaev, P., et al., "Gas-phase catalytic growth of single-walled carbon nanotubes from carbon monoxide," *Chem. Phys. Lett.* 313, 91–97 (1999), and by Bronikowski M. J., et al., "Gas-phase production of carbon single-walled nanotubes from carbon monoxide via the HiPco process: A parametric study," *J. Vac. Sci. Technol.* 19, 1800–1805 (2001).

The starting materials for the composites of this invention are preferably powder mixtures of the ceramic material and the carbon nanotubes. The particle size of the ceramic component can vary while still achieving the benefits of the presence of the carbon nanotubes when consolidated and densified. The particles can be micron-sized, sub-micron-sized, or nano-sized. The term. "micron-sized" refers to particles having diameters that are greater than 1 micron, "sub-micron-sized" refers to particles whose diameters are within the range of 100 nm to 1,000 nm, typically 150 nm or above, and "nano-sized" refers to particles whose diameters are less than 100 nm, particularly 50 nm or below. As the particle size of the starting ceramic material decreases, the final density of the sintered composite product increases. Accordingly, particles that are less than 500 nm in diameter on the average are preferred, and those that are less than 100 nm in diameter are particularly preferred.

The powder mixtures used as starting materials, as well as the compressed composites formed from the starting materials, may contain single-wall or multi-wall carbon nanotubes, or mixtures of single- and multi-wall carbon nanotubes. It is preferred however that the mixtures, and the final product as well, be free of all carbon nanotubes except single-wall carbon nanotubes, or if double-wall or multi-wall carbon nanotubes are present, that the carbon nanotubes in the mixture be predominantly single-wall carbon nanotubes. The term "predominantly" in this context is used herein to mean that either no multi-wall carbon nanotubes are present or that the amount of carbon nanotubes having more than a single wall is so small relative to the amount of single-wall nanotubes that the multi-wall nanotubes do not obliterate or significantly reduce the beneficial properties of the composite that are attributable to the single-wall nanotubes.

The relative amounts of ceramic material and carbon nanotubes can vary, although the mechanical properties and possibly the performance characteristics may vary with the proportions of the carbon nanotubes. In most cases, best results will be achieved with composites in which the carbon nanotubes constitute from about 1% to about 50%, preferably from about 2.5% to about 25%, and most preferably from about 5% to about 20%, by volume of the composite. The volumes used in determining the volume percents referred to herein are calculated from the weight percents of the bulk starting materials and the theoretical density of each component.

The carbon nanotubes can be dispersed through the ceramic powder by conventional means to form a homogeneously dispersed powder mixture, although a preferred method is one in which the materials are mixed by being suspended together in a common liquid suspending medium. Any readily removable, low-viscosity, inert suspending liquid, such as a low molecular weight alcohol (ethanol, for example), can be used. Carbon nanotubes are available from commercial suppliers in a paper-like form, and can be dispersed in ethanol and other liquid suspending agents with the assistance of ultrasound.

A preferred means of mixing the ceramic particles and the carbon nanotubes is by ball-milling in conventional rotary mills with the assistance of tumbling balls. The sizes of the balls, the number of balls used per unit volume of powder, the rotation speed of the mill, the temperature at which the milling is performed, and the length of time that milling is continued can all vary widely. Best results will generally be achieved with a milling time ranging from about 4 hours to about 50 hours. The degree of mixing may also be affected by the "charge ratio," which is the ratio of the mass of the balls to the mass of the powder. A charge ratio of from about 20 to about 100 will generally provide proper mixing.

The qualities of the product can be enhanced by mechanical activation of the ceramic particles prior to consolidating them into a composite. Mechanical activation is likewise achieved by methods known in the art and is typically performed in centrifugal or planetary mills that apply centrifugal and/or planetary action to the powder mixture with the assistance of grinding balls. The grinding balls produce impacts of up to 20 g (20 times the acceleration due to gravity). Variables such as the sizes of the milling balls, the number of milling balls used per unit amount of powder, the temperature at which the milling is performed, the length of time that milling is continued, and the energy level of the mill such as the rotational speed or the frequency of impacts, can vary widely. The number and size of the milling balls relative to the amount of powder is typically expressed as the "charge ratio," which is defined as the ratio of the mass of the milling balls to the mass of the powder. A charge ratio of at least about 5, preferably about 5 to about 20, and most preferably about 10 to about 15, will generally provide the best results. Preferred milling frequencies are at least about 3, and preferably about 3 to 30 cycles per second or, assuming two impacts per cycle, at least about 6, and preferably about 6 to about 60 impacts per second.

Uniaxial compression during consolidation can be achieved by conventional means. The benefits of the invention will be most evident when the composite is densified to a high density, i.e., one that approaches full theoretical density, which is the density of the material as determined by volume-averaging the densities of each of its components. The term "relative density" is used herein to denote the actual density expressed as a percent of the theoretical density. It is believed that favorable results will be achieved with a relative density of 90% or above, with best results at a relative density of at least 95%, preferably at least 98%, and most preferably at least 99%.

In the practice of this invention, uniaxial compression is preferably performed in combination with electric field-assisted sintering. One method of performing this type of sintering is by passing a pulsewise DC electric current through the dry powder mixture or through a consolidated mass of the mixture while applying pressure. A description of electric field-assisted sintering and of apparatus in which this process can be performed is presented by Wang, S. W., et al., "Densification of $Al_2O_3$ powder using spark plasma sintering," *J. Mater. Res.* 15(4), 982–987 (2000). While the conditions may vary, best results will generally be obtained with a densification pressure exceeding 10 MPa, preferably from about 10 MPa to about 200 MPa, and most preferably from about 40 MPa to about 100 MPa. The preferred current is a pulsed DC current of from about 250 $A/cm^2$ to about 10,000 $A/cm^2$, most preferably from about 500 $A/cm^2$ to about 1,500 $A/cm^2$. The duration of the pulsed current will generally range from about 1 minute to about 30 minutes, and preferably from about 1.5 minutes to about 5 minutes. Preferred temperatures are within the range of from about 800° C. to about 1,500° C., and most preferably from about 900° C. to about 1,400° C. The compression and sintering are preferably performed under vacuum. Preferred vacuum levels for the densification are below 10 Torr, and most preferably below 1 Torr.

The reduction in thermal conductivity in the direction of compression that is achieved by the practice of this invention can vary from less than 50% to greater than 90%, and accordingly the ratio of the thermal conductivity in the direction of compression to that in directions that are transverse to the direction of compression can vary from greater than 0.5 to less than 0.1. In preferred embodiments, this thermal conductivity ratio is about 0.4 or less, preferably about 0.25 or less. The terms "thermal diffusivity" and "thermal conductivity" are used interchangeably herein.

Figure 2:
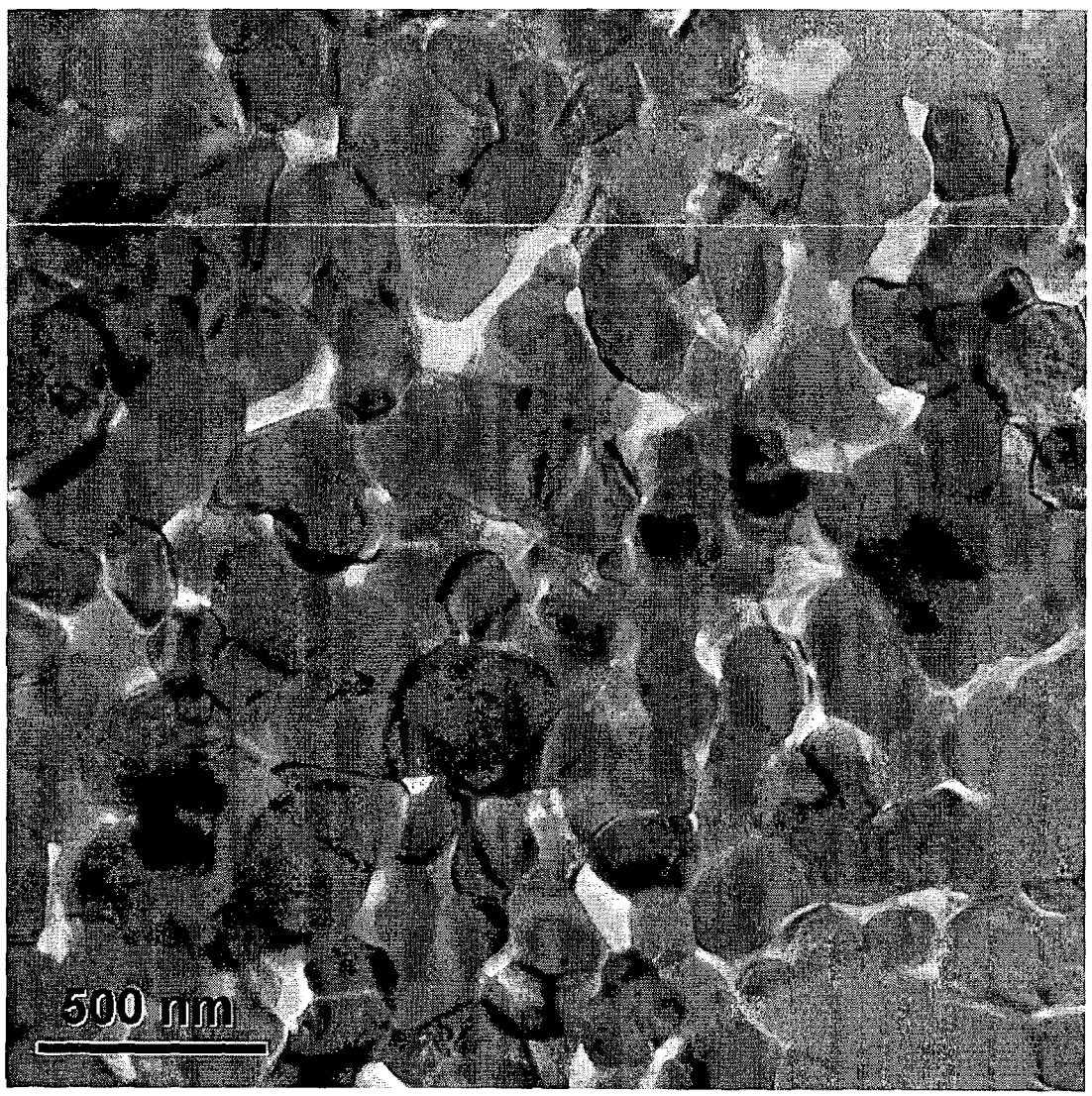
FIG. 2 is a transmission electron microscope image of a composite prepared in accordance with the present invention.
Figure 3:
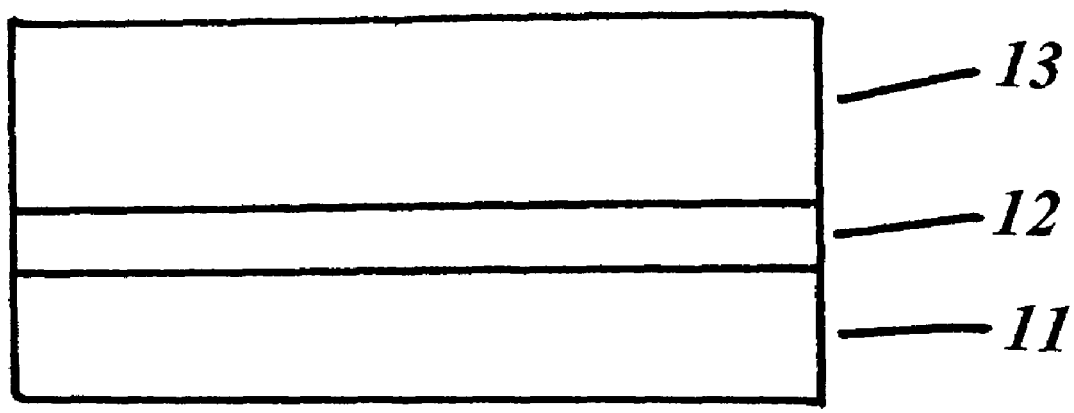
FIG. 3 is a representation of a structure in accordance with the invention.

FIGS. 1 and 2 are explained in the Examples below. FIG. 3 is a representation of the invention, showing an exothermic device 11 (such as a microprocessor device), a heat spreading layer 12, and a heat sink 13.

The following examples are offered for purposes of illustration and are not intended to limit the scope of the invention.

EXAMPLES

Alumina powder, consisting of 80% $\alpha$-$Al_2O_3$ and 20% $\gamma$-$Al_2O_3$ with particle sizes of 300 nm (40 nm crystallite size) and 20 nm, respectively, was obtained from Baikowski International Corporation (Charlotte, N.C., USA). Gas condensation synthesized $\gamma$-$Al_2O_3$ with average particle sizes of 15 nm and 32 nm was obtained from Nanotechnologies Inc. (Austin, Tex., USA) and Nanophase Technologies Corporation (Darien, Ill., USA), respectively. Purified single-wall carbon nanotubes (SWCN) in paper form, produced by the HiPco process with more than 90% of the catalyst particles removed were obtained from Carbon Nanotechnologies (Houston, Tex., USA). The SWCN were dispersed in ethanol with the assistance of ultrasound. The alumina was then mixed with the SWCN dispersion, and the combined dispersion was sieved using a 200-mesh sieve, then ball-milled for 24 hours (still in ethanol) using zirconia milling media, and then dried to form a dry powder mixture. An alumina-SWCN mixture at 10% SWCN, by volume, was prepared in this manner.

For certain experiments, the alumina was mechanically activated by high-energy ball milling prior to being combined with the SWCN. The high-energy ball milling was performed with 1 weight percent polyvinyl alcohol on a Spex 8000 mixer mill (Spex Industries, Metuchen, N.J., USA) in a zirconia vial. The polyvinyl alcohol was included to prevent severe agglomeration of the powder. Milling was performed at room temperature for 24 hours, after which time the polyvinyl alcohol was removed by heating the powder at 350° C. for 3 hours under vacuum. The alumina was then mixed with the SWCN dispersion, and the combined dispersion was sieved, ball-milled, and dried as described above. An alumina-SWCN mixture at 15% SWCN, by volume, was prepared in this manner.

To consolidate and densify the powder mixtures, each powder mixture was placed on a graphite die of inner diameter 19 mm and cold-pressed at 200 MPa. The cold-pressed powder mixture was then sintered on a Dr. Sinter 1050 Spark Plasma Sintering System (Sumitomo Coal Mining Company, Japan) under vacuum. Electric field-assisted sintering was then performed at an applied pressure of 80 MPa with a pulsed DC current of about 5,000 A maximum and a maximum voltage of 10 V. The pulses had a period of about 3 ms and followed a pattern of 12 cycles on and 2 cycles off. Once the pressure was applied, the samples were heated to 600° C. in 2 minutes and then heated further at rates of 550° C./min to 600° C./min to 1,150–1200° C. where they were held for 3–5 minutes. The temperature was monitored with an optical pyrometer focused on a depression in the graphite die measuring 2 mm in diameter and 5 mm in depth. The resulting sintered compacts were disks measuring 19 mm in diameter and 1.5 to 3 mm in thickness. For those powders that were consolidated and densified in this manner without prior mechanical activation, a sintering temperature was used that was higher by 50 degrees Celsius than the sintering temperature used on the powders that had been mechanically activated.

The final densities of the sintered compacts were measured by the Archimedes method using deionized water as the immersion medium. The density of the SWCN used as a starting material was 1.8 g/cm³. Microstructure determinations of the sintered compacts were performed with an FEI XL30-SFEG high-resolution scanning electron microscope (SEM) with a resolution better than 2 nm. Grain sizes were estimated from the SEM determinations on fracture surfaces together with X-ray diffraction profiles. Additional characterizations by analytical electron microscopy and high-resolution transmission electron microscopy (TEM) were performed on a Philips CM-200 with a field emission gun operating at 200 kV.

Thermal diffusivity measurements were performed by the use of a Xenon Flash Thermal Diffusivity System both on the sintered disks and on rectangular bars measuring 3–6 mm×15–16 mm cut from the sintered disks. The measurements were taken in two orientations, i.e., the orientation along the uniaxial compression axis, which is referred to herein as the "transverse" orientation since it was transverse to the flat surfaces of the specimen disk, and the orientation perpendicular to the hot-pressing direction, which is referred to herein as the "in-plane" direction since it was in the plane of the disk. For each orientation, the measurement was performed by applying a short heat pulse (less than 1 millisecond in duration) to one surface of the disk or bar using a xenon flash lamp, while using an InSb infrared detector to measure the temperature change at the surface across from the surface to which the pulse was applied, the direction normal to the two surfaces defining the orientation being measured.

Table I below lists the starting materials used, the processing conditions, and the characteristics of the products, including the relative density, grain size, and thermal conductivities, with separate measurements for thermal conductivities in the transverse and in-plane orientations. The starting particle sizes shown in the table are averages on a volume basis.

TABLE I

Oriented Thermal Conductivities for SWCN-Alumina Composites Sintered by Spark Plasma Sintering

| No. | Specimen Composition and Starting Particle Size | Processing Conditions | Relative Density (%) | Product Grain Size (nm) | Thermal Conductivity (W/mK at 25° C.) Transverse | In-Plane |
|---|---|---|---|---|---|---|
| (1) | Pure $Al_2O_3$ (80% α; 300 nm; 20% γ; 20 nm) | SPS/1150° C./ 3 min | 100 | 349 | 27.3 | 27.3 |
| (2) | γ-$Al_2O_3$ with 10% SWCN; 32 nm | SPS/1200° C./ 3 min | 98 | ~100 | 11.4 | 24.0 |
| (3) | γ-$Al_2O_3$ with 15% SWCN; 15 nm | SPS/1150° C./ 3 min | 99.2 | ~100 | 7.3 | — |

FIG. 1 is a bar graph showing the thermal diffusivities of various samples, each set of bars representing five individual tests (the five bars of each set beginning with the left bar as the first) and an average of the five values (the bar at the right of each set). The first three sets of bars each represent measurements taken directly on sintered disks in the transverse direction, while the last two sets represent measurements taken on bars cut from sintered disks, the measurements taken in the transverse and in-plane directions. The first set, labeled "$Al_2O_3$," represents disks of alumina corresponding to the first row of Table I and containing no SWCN. The second and third sets represent the SWCN-containing composites, with 10% and 15% SWCN, respectively. The fourth and fifth sets of bars represent the SWCN-containing composite with 10% SWCN. The data shown in FIG. 1 are listed in Table II below.

TABLE II

Thermal Diffusivities for Alumina and SWCN-Alumina Composites Sintered by Spark Plasma Sintering (Data Shown in FIG. 1)

| Test No. | $Al_2O_3$ Disks | 10% SWCN Disks | 15% SWCN Disks | 10% SWCN Bars Transverse | In-Plane |
|---|---|---|---|---|---|
| 1 | 0.0884 | 0.0395 | 0.0258 | 0.0411 | 0.0840 |
| 2 | 0.0864 | 0.0392 | 0.0261 | 0.0419 | 0.0859 |
| 3 | 0.0846 | 0.0392 | 0.0262 | 0.0410 | 0.0846 |
| 4 | 0.0862 | 0.0396 | 0.0260 | 0.04409 | 0.0844 |
| 5 | 0.0895 | 0.0394 | 0.0260 | 0.0411 | 0.0849 |
| Average | 0.0870 | 0.0394 | 0.0260 | 0.0412 | 0.0848 |

The data in both Tables I and II and the bar graph show that the in-plane thermal condutivities i.e., the conductivity perpendicular to the uniaxial compression axis) and in-plane diffusivities of the sintered samples are approximately the same regardless of whether the samples are pure alumina or composites of alumina and carbon nanotubes. By contrast, the transverse thermal conductivities and diffusivities (i.e., those measured along the hot-pressing direction) are significantly decreased when the carbon nanotubes are present, and that an increase in the level of carbon nanotubes produces a greater drop in thermal conductivity or diffusivity in the transverse direction. In the composite containing 15% SWCN, the transverse thermal characteristic is reduced to approximately one fourth of that of the pure alumina.

The microstructure of the sintered 10% SWCN composite was observed by transmission electron microscopy (TEM), and the image is shown in FIG. 2. In this image, the light regions are filled with carbon nanotubes. The image shows that the carbon nanotubes are homogeneously dispersed throughout the alumina grains, with a minor level of agglomeration. The carbon nanotubes appear as ropes entangled with the alumina grains to form a network structure.

Analyses by X-ray diffraction showed that the alumina in all sintered samples was entirely α-alumina.

The foregoing is offered primarily for purposes of illustration and explanation. Further variations, modifications and substitutions that, even though not disclosed herein, still fall within the scope of the invention may readily occur to those skilled in the art.

What is claimed is:

1. In an application requiring the conduction of heat between an exothermic device and a heat sink surface, the improvement comprising interposing between said exothermic device and said heat sink surface a heat-spreading layer of a composite comprised of carbon nanotubes dispersed in a matrix of ceramic material, said composite having been uniaxially compressed in a direction transverse to said heat sink surface to provide said composite with a thermal diffusivity in said transverse direction that is lower than the thermal diffusivity in said transverse direction of a matrix of ceramic material lacking said carbon nanotubes.

2. The improvement of claim 1 in which said composite is the product of a process comprising consolidating a mixture of ceramic particles of less than 500 nm in diameter and carbon nanotubes into a continuous mass by uniaxially compressing said mixture while passing a pulsed electric current through said mixture.

3. The improvement of claim 1 in which said composite has a density of at least 90% relative to a volume-averaged theoretical density.

4. The improvement of claim 1 in which said composite has a density of at least 95% relative to a volume-averaged theoretical density.

5. The improvement of claim 1 in which said composite has a density of at least 98% relative to a volume-averaged theoretical density.

6. The improvement of claim 1 in which said composite has a density of at least 99% relative to a volume-averaged theoretical density.

7. The improvement of claim 1 in which said carbon nanotubes are predominantly single-wall carbon nanotubes.

8. The improvement of claim 1 in which said carbon nanotubes constitute from about 1% to about 50% of said composite by volume.

9. The improvement of claim 1 in which said carbon nanotubes constitute from about 2.5% to about 25% of said composite by volume.

10. The improvement of claim 1 in which said carbon nanotubes constitute from about 5% to about 20% of said composite by volume.

11. The improvement of claim 1 in which said ceramic material is a metal oxide selected from the group consisting of alumina, zirconia, magnesium oxide, magnesia spinel, zirconia, titania, cerium oxide, chromium oxide, and hafnium oxide.

12. The improvement of claim 1 in which said ceramic material is alumina.

13. The improvement of claim 1 in which said ceramic material is alumina and said carbon nanotubes are predominantly single-wall carbon nanotubes constituting from about 5% to about 25% of said composite.

14. The improvement of claim 2 in which said process comprises uniaxially compressing said mixture at a pressure of from about 10 MPa to about 200 MPa and a temperature of from about 800° C. to about 1,500° C., and said sintering electric current is a pulsed direct current of from about 250 $A/cm^2$ to about 10,000 $A/cm^2$.

15. The improvement of claim 2 in which said process comprises uniaxially compressing said mixture at a pressure of from about 40 MPa to about 100 MPa and a temperature of from about 900° C. to about 1,400° C., and said sintering electric current is a pulsed direct current of from about 500 $A/cm^2$ to about 5,000 $A/cm^2$.

16. The improvement of claim 1 in which said exothermic device is a microprocessor.

* * * * *